United States Patent [19]

Smith et al.

[11] 4,273,914

[45] Jun. 16, 1981

[54] PRE-REACTED CARBOXYLIC ACID ANHYDRIDE COMPLEXES AS LOW TEMPERATURE CURING AGENTS FOR EPOXY RESINS

[75] Inventors: James D. B. Smith, Wilkins Township, Allegheny County; Arthur W. Ott, Wilkinsburg, both of Pa.

[73] Assignee: Westinghouse Electric Corp., Pittsburgh, Pa.

[21] Appl. No.: 127,615

[22] Filed: Mar. 6, 1980

[51] Int. Cl.³ .................... C08G 59/42; C08G 59/68; C08G 59/72

[52] U.S. Cl. ........................ 528/89; 252/182; 525/507; 528/91; 528/92; 528/361; 528/365; 528/368; 528/408; 528/409; 528/411

[58] Field of Search .................... 528/89, 91, 92, 408, 528/409, 411, 361, 365, 368; 252/182; 525/507

[56] References Cited

U.S. PATENT DOCUMENTS

| | | | |
|---|---|---|---|
| 2,839,495 | 6/1958 | Carey | 528/91 |
| 3,281,376 | 10/1966 | Proops | 260/2 |
| 3,352,826 | 11/1967 | McWhorter et al. | 528/91 X |
| 3,622,524 | 11/1971 | Markovitz et al. | 260/2 EC |
| 3,728,306 | 4/1973 | Markovitz et al. | 260/47 EC |
| 3,799,905 | 3/1974 | Holloway et al. | 260/37 EP |
| 4,020,017 | 4/1977 | Smith et al. | 260/2 EC |

*Primary Examiner*—Earl A. Nielsen
*Attorney, Agent, or Firm*—D. P. Cillo

[57] ABSTRACT

A low temperature, fast curing epoxy insulating composition is made by low temperature mixing an epoxy resin with a carboxylic acid anhydride complex, the anhydride complex being the low temperature reaction product of a selected Lewis Acid catalyst and a carboxylic acid anhydride.

21 Claims, 3 Drawing Figures on # PRE-REACTED CARBOXYLIC ACID ANHYDRIDE COMPLEXES AS LOW TEMPERATURE CURING AGENTS FOR EPOXY RESINS

BACKGROUND OF THE INVENTION

To improve high temperature stability and to provide better physical and electrical properties over amine cured epoxy resin systems, carboxylic acid anhydride curing agents have been found to be particularly useful with epoxy resins for high voltage insulation applications. With certain cycloaliphatic epoxy resins, carboxylic acid anhydrides only are used as curing agents because of the relative unreactivity of these types of epoxies with amine curing agents.

However, one serious drawback to using carboxylic acid anhydride curing agents lies in their very sluggish reactivities at temperatures close to room temperature. Usually the addition of an accelerator is required to give reasonable gel times at elevated temperatures, but at room temperature, even with high concentrations of accelerators, very slow gel times are still experienced. Under conditions of room temperature cure, it is not unusual for an epoxy-anhydride resin sample to stay tacky for several weeks before finally attaining a completely cured, tack-free condition. Considerable effort has been devoted in recent years to developing improved room temperature curing agents for epoxy-anhydride resins. This need has become even more critical with the recent natural gas shortages, which curtailed the use of heat energy to cure resins in industrial applications.

Proops, in U.S. Pat. No. 3,281,376, attempted to solve problems of room temperature cure of epoxides which could contain acid anhydride hardeners. After exploring pre-reaction of the epoxy with Lewis Acids, such as boron trifluoride and stannic chloride, and discarding those combinations because of uncontrolled exotherms, bubble formation and foaming, Proops discovered a method of pre-reacting tin organo phosphates, such as stannic tetrakis [di(propyl)phosphate], with the epoxides. This reacted epoxide could then be allowed to cure slowly at room temperature, or could be copolymerized with an organic hardener, such as an amine or a polycarboxylic acid anhydride. Smith et al., in U.S. Pat. No. 4,020,017, used minor amounts of organo-tin compounds, such as triphenyl-tin chloride, to form apparent complexes with reactive epoxide diluents, for use as additives to cycloaliphatic and glycidyl ester epoxy resins, to provide resinous electrical insulating compositions without using acid anhydrides. These compositions however, require at least 120° C. curing temperatures.

Holloway et al., in U.S. Pat. No. 3,799,905, in another area, taught low temperature curable, moisture resistant dental epoxides, cured by a curing agent consisting of a $BF_3$, $SbCl_5$, $TiCl_4$, $SiCl_4$, $FeCl_3$, $AlCl_3$ or $SnCl_4$ complex with a strong non-carboxylic acid, such as nitric or hydrochloric acid. The weight ratio of halide compound:non-carboxylic acid was from 50:100 to 25:100. Cure was relatively slow to allow shaping during use in restorative dentistry, Markovitz, in U.S. Pat. No. 3,728,306 and U.S. Pat. No. 3,622,524, relating to electrical grade epoxies, taught pre-reaction of organo stannoic acids and organo tin oxides respectively, with carboxylic acid anhydrides, to form reaction products that could cure epoxy resins at below 100° C. The tin-anhydride reaction product, containing at least about 10 wt% organo tin compound, however, required heating at between about 75° C. to 250° C., from 1 to 4 hours, to dissolve the materials and form a useful, epoxy reactive, low temperature curing agent. Usually, a solid was formed which liquified at about 80° C. to 160° C. and which would usually require melting to react with epoxy. Again, a considerable amount of heat was required in this process.

What is needed, is a curing additive for an epoxy-carboxylic acid anhydride system that will allow complete admixing and fast cure at up to about 45° C., without loss of physical, thermal or electrical properties.

SUMMARY OF THE INVENTION

It has been discovered that selected Lewis Acid catalysts, such as $SnCl_4$, when pre-reacted in minor amounts with a carboxylic acid anhydride, at a reacting mass temperature of between 10° C. to about 45° C., will form an electron charge transfer complex reactive species that is a particularly effective low temperature curing agent for epoxy resins. When this reaction product complex is admixed with epoxy resins, preferably at a reacting mass temperature of between about 10° C. to about 45° C., it allows cure of the epoxy resin at between 10° C. to about 45° C., within about 4 to 168 hours, usually within 4 to 48 hours. The cured epoxy needs no postcuring, and will retain outstanding physical, thermal and electrical characteristics. The weight ratio of selected Lewis Acid catalyst: carboxylic acid anhydride is preferably between 0.0060:1 to 0.0001:1. The Lewis Acid catalysts effective to activate the carboxylic acid anhydride are selected from at least one of $SbCl_5$, $SbF_5$, $BF_3$, and $PF_5$, and preferably, $TiCl_4$ or $SnCl_4$.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENT

Figure 1:
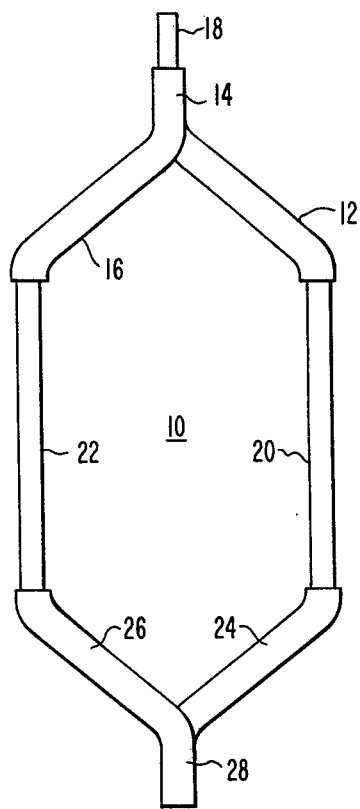
FIG. 1 shows a wrapped, resin-impregnated coil made with the resinous composition of this invention.

It has been found that selected Lewis Acid catalysts can effectively react and complex with organic carboxylic acid anhydrides to form reactive species that are particularly effective in curing epoxy resin systems at temperatures below about 45° C. These low temperature curable resins are useful in a variety of applications, such as high speed, fast curing injection molding compounds, low viscosity vacuum impregnation compositions and highly filled potting compounds. The useful Lewis Acid catalysts that can be utilized to activate the carboxylic acid anhydride in the present invention are selected from $SbCl_5$, $SbF_5$, $BF_3$, $PF_5$, and preferably $TiCl_4$ or $SnCl_4$, and their mixtures.

The useful, selected Lewis Acid catalysts must be admixed in critical proportions with a carboxylic acid anhydride, within a critical reacting mass temperature range of between 10° C. to about 45° C., preferably at 25° C., to allow interaction without breaking the anhydride ring, to form a charge transfer complex reactive species, i.e., an activated carboxylic acid anhydride. This activated anhydride can then be added to the epoxy at a reacting mass temperature of between 10° C. to about 45° C. The preferred weight ratio of selected Lewis Acid catalyst: carboxylic acid anhydride is between 0.0060:1 to 0.0001:1, and most preferably between about 0.004:1 to 0.0001:1.

Over 0.0060 part Lewis Acid catalyst/part anhydride, high exotherms will usually occur during mixing with the anhydride, which would open the anhydride ring and destroy the charge complex curing agent. These exotherms could cause side reactions, such as loss of the components by volatilization, and formation of multi-cyclic by-products which would not be effective in curing epoxy resins. It may be possible to control such exotherms by advanced cooling techniques. Over about 0.0060 part of Lewis Acid catalyst/part anhydride, high metal concentrations would result when the curing agent is mixed with epoxy, causing deleterious effects on the electrical properties of the cured resin. Under 0.0001 part Lewis Acid catalyst/part anhydride, ineffectual amounts of charge transfer complex reactive species curing agent will be formed.

Admixing the Lewis Acid catalyst with anhydride at over about 45° C., will result in opening the anhydride ring and causing side reactions which would cause losing components by volatilization, and destroying the charge complex cationic reactive species curing agent. Admixing the activated anhydride with epoxy at over about 45° C., could result in instantaneous gellation, making homogeneous mixing impossible. Reaction under 10° C., will not provide adequate interaction and crystallization of the liquid anhydride could occur, making mixing of the components difficult.

The useful organic, carboxylic acid anhydrides reactive with the selected Lewis Acid catalysts and with the base epoxy resin, include the conventional organic mono- and poly-functional anhydrides. The anhydride component mixed with the Lewis Acid catalyst must be in liquid form. To achieve the liquid form, solid anhydride may be mixed with liquid anhydride in which it is soluble. Typical of the monofunctional anhydrides are hexahydrophthalic anhydride, 1-methylhexahydrophthalic anhydride, tetrahydrophthalic anhydride, 1-methyltetrahydrophthalic anhydride, phthalic anhydride, endomethylenetetra-hydrophthalic anhydride, methyl endomethylenetetrahydrophthalic anhydride, dodecenyl succinic anhydride, maleic anhydride and the like. Poly-functional anhydrides which may be employed include pyromellitic dianhydride, polyazelaic polyanhydride, the reaction product of trimellitic anhydride and a glycol, and benzophenone tetracarboxylic acid dianhydride. These organic anhydrides may be used singly or in admixture to provide a final liquid form. Non-carboxylic acids or non-carboxylic acid anhydrides are not useful to provide adequate reaction or curing in this system. In relation to the base resins, the total anhydride content of the resinous mixture must lie within the range of from about 0.5 to about 1.5 anhydride equivalents for each epoxy equivalent.

The coloration developed when the Lewis Acid catalyst is added to the anhydride at up to about 45° C., shows that an electron charge transfer complex reactive ionic species is formed between anhydride carboxylic groups and, for example $SnCl_4$, which is extremely reactive with epoxy functionality. The reactive species curing agent is one where an oxonium type cation is formed by donation of the electrons from the central oxygen on the anhydride ring, which remains unbroken, to the stannic chloride or other Lewis Acid catalyst molecule. The cationic species would consist essentially of an electron charge transfer complex, having an unbroken anhydride ring, as shown below, formed in general by the reaction:

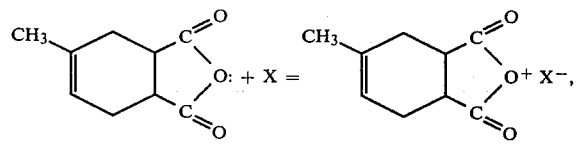

wherein X is selected from the group consisting of $SbCl_5$, $SbF_5$, $BF_3$, $PF_5$, $TiCl_4$ and $SnCl_4$. This carboxyic cationic species would be stabilized by the X counter anion in the absence of epoxy functionality. If a di-functional anhydride were used, the X component would complex with one or both of the anhydride groups. In the presence of epoxy groups a rapid cationic polymerization will ensue involving both anhydride and epoxy molecules. As pointed out above, admixture of anhydride and Lewis Acid reactants at a reacting mass temperature of over about 45° C., will not produce the above charge transfer structure. Controlling this temperature in forming the cationic species is critical to this invention.

Evidence for this mechanism was found by the fact that less than stoichiometric amounts of the selected Lewis Acid catalyst anhydride curing agent can be used with epoxy resins and satisfactory room temperature cure is still obtainable. This can only occur if the excess epoxy groups are self-reacting (without anhydride) via a cationic mechanism, either through the reactive cationic species shown above or through liberation of the selected Lewis Acid catalyst.

The mechanism would also explain why high heat reacted organo tin-anhydride catalyst materials are less reactive than these X anhydride types described above, since the application of heat over about 45° C. will open the anhydride ring, destroy cationic species shown in the above mechanism and produce less reactive tin carboxylate ester compounds.

One type of epoxy resin, which may be used as the base resin in the invention, is obtainable by reacting epichlorohydrin with a dihydric phenol in an alkaline medium at about 50° C., using 1 to 2 or more moles of epichlorohydrin per mole of dihydric phenol. The heating is continued for several hours to effect the reaction, and the product is then washed free of salt and base. The product, instead of being a single simple compound, is generally a complex mixture of glycidyl poyethers, but the principal product may be represented by the chemical structural formula:

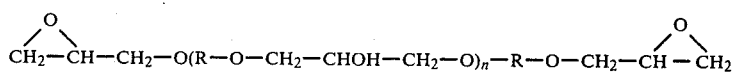

where n is an integer of te series 0, 1, 2, 3 . . . , and R represents the divalent hydrocarbon radical of the dihydric phenol. Typically R is:

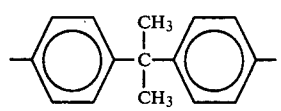

to provide a diglycidyl ether of bisphenol A type epoxy resin or

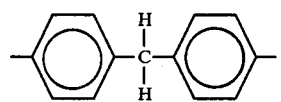

to provide a diglycidyl ether of bisphenol F type epoxy resin.

The bisphenol epoxy resins used in the invention have a 1, 2 epoxy equivalency greater than one. They will generally be diepoxides. By the epoxy equivalency, reference is made to the average number of 1, 2 epoxy groups,

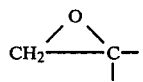

contained in the average molecule of the glycidylether.

Other epoxy resins that are useful in this invention include polyglycidylethers of a novolac. The polyglycidylethers of a novolac suitable for use in accordance with this invention are prepared by reacting an epihalohydrin with phenol formaldehyde condensates. While the bisphenol-based resins contain a maximum of two epoxy groups per molecule, the epoxy novolacs may contain as many as seven or more epoxy groups per molecule. In addition to phenol, alkyl-substituted phenols such as o-cresol may be used as a starting point for the production of epoxy novolac resins.

Other useful epoxy resins include glycidyl esters, hydantoin epoxy resins, cycloaliphatic epoxy resins and diglycidyl ethers of aliphatic diols. The glycidyl ester epoxy resins which can be employed in this invention are non-glycidyl ether epoxy resins containing more than one 1,2 epoxy group per molecule. They are characterized by substitution of the ester bond,

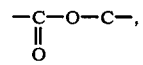

for the ether bond, —O—, and have the chemical structural formula:

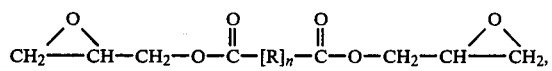

where R is an organic radical substituent selected from the group consisting of R', R'—O—R', R'—COO—R' and mixtures thereof, where R' is selected from the group consisting of alkylene groups, having from about 1-8 carbon atoms, saturated cycloalkylene groups where the ring has 4 to 7 carbons and mixtures thereof, where n is from about 1-8.

The hydantoin epoxy resins which can be employed in this invention are based on hydantoin, a nitrogen-containing heterocyclic ring having the structure:

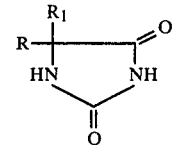

A wide variety of compounds can be formed by reacting the nitrogen positions in the five membered hydantoin ring. The hydantoin ring is readily synthesized from ketones, hydrogen, cyanide, ammonia, carbon dioxide and water. The epoxy resins are formed through reaction of the hydantoin with epichlorohydrin. Hydantoin rings can be linked together to form extended resins analogous in structure to bisphenol A. Polyfunctional resins can also be formed from these chain-extended materials by glycidylization of the hydroxyls and the remaining nitrogens. These heterocyclic glycidyl amine epoxy resins can be represented by the structural formula:

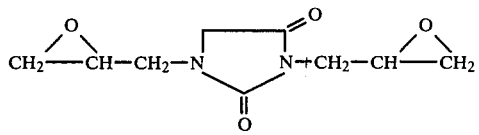

The cycloaliphatic type epoxy resins employed as the resin ingredient in the invention are selected from non-glycidyl ether epoxy resins containing more than one 1,2 epoxy group per molecule. These are generally prepared by epoxidizing unsaturated aromatic hydrocarbon compounds, such as cyclo-olefins, using hydrogen peroxide or peracids such as peracetic acid and perbenzoic acid. The organic peracids are generally prepared by reacting hydrogen peroxide with either carboxylic acids, acid chlorides or ketones to give the compound R—COOOH.

Examples of cycloaliphatic epoxy resins would include: 3,4-epoxycyclohexylmethyl-3,4-epoxycyclohexane carboxylate (containing two epoxide groups which are part of ring structures, and an ester linkage); vinyl cyclohexene dioxide (containing two epoxide groups, one of which is part of a ring structure); 3,4-epoxy-6-methylcyclohexyl methyl-3,4-epoxy-6-methylcyclohexane carboxylate and dicyclopentadiene.

Other useful epoxy resins include diglycidyl ethers of an aliphatic diol having from 2 to 12 carbon atoms. These are low viscosity epoxy resins, usually monomers. Included are diglycidyl ethers of a glycol having from 2 to 12 carbon atoms between the glycidyl ether units, i.e., 2 to 12 carbons in the glycol unit, for example, diglycidyl ether of neopentyl glycol (DGENPG), diglycidyl ethers of 1,4 butane diol, diglycidyl ethers of ethylene glycol, ad diglycidyl ethers of polyether glycols, such as, for example, diglycidyl ethers of triethylene glycol and diglycidyl ethers of tetraethylene glycol and their mixtures.

It is useful in some applications to use some of these diglycidyl ethers of aliphatic diols in combination with the other epoxy resins, because the aliphatic diol epoxides are all low viscosity materials, generally between about 5 cps. and 60 cps. at 25° C., and help to reduce the viscosity of the resin composition for impregnation purposes. The epoxy resin system can consist of: (A) a first epoxy resin having a low viscosity (between about 5 cps. and about 60 cps. at 25° C.) i.e., diglycidyl ethers of aliphatic diols and (B) another or second epoxy resin that has a high viscosity (above about 250 cps. and generally between about 250 cps. and about 20,000 cps. at 25° C.) i.e., bisphenol A, bisphenol F, novolacs, glycidyl esters, hydantoins, cycloaliphatics and their mixtures; in the weight ratio of diglycidyl ether of an aliphatic diol low viscosity epoxy resin: second epoxy resin having a high viscosity of from about 1.0:0.5 to about 1.0:4.0.

All of these epoxy resins can be characterized by reference to their epoxy equivalent weight, which is defined as the mean molecular weight of the particular resin divided by the mean number of epoxy radicals per molecule. In the present invention, all of the suitable epoxy resins will have a preferred epoxy equivalent weight of from about 100 to about 500 with a most preferred range of about 150 to about 250. All of these epoxy resins are well known and commercially available. Further reference can be made to Lee and Neville, *Handbook of Epoxy Resins,* McGraw-Hill, 1967, chapters 2-10 to 2-27 and to U.S. Pat. No. 4,137,275, both herein incorporated by reference, for further details of their structure and manufacture.

For a number of special purposes straight epoxyanhydride resins may be considered to have certain disadvantages. These disadvantages may include high cost and too great a rigidity for some applications. The epoxy resins may be modified by incorporation of various diluents, flexibilizers and fillers.

Liquid, monoethylenically unsaturated vinyl monomer is one example of a material that can also be used to reduce viscosity of the epoxy-anhydride resin system for impregnation purposes. Examples of useful vinyl monomers include styrene, t-butyl styrene, vinyl toluene, methyl methacrylate, methyl vinyl ketone and the like, and their mixtures. They can be added in amounts up to 300 parts, preferably between 50 parts and 250 parts, per 100 parts of epoxy resin. This combination of materials can provide impregnating varnishes having viscosities of between 1 cps. and 25 cps. at 25° C.

Epoxidized natural oil extenders, such as epoxidized linseed or soy bean oils, octyl epoxy tallate and reactive plasticizers such as the conventional phthalates and phosphates may also be used in small amounts, up to about 40 parts per 100 parts of epoxy resin to provide increased flexibility. Thixotropic agents, such as $SiO_2$ and pigments, such as $TiO_2$, may be used as aids in fluidizing the composition or enhancing the color tones of the cured resins. Similarly, various inorganic particulate fillers, such as silica, quartz, beryllium aluminum silicate, lithium aluminum silicate and mixtures thereof, in average particle sizes of from about 10 microns to 300 microns, may be employed in amounts up to about 100 parts per 100 parts of epoxy resin, to improve electrical properties of the resin formulation and to provide potting compounds for coils, transformers, bushing studs and the like.

In the method of this invention, the liquid carboxylic acid anhydride is activated by simple admixture with the selected Lewis Acid catalyst, usually by dropwise addition of the catalyst at a reacting mass temperature of between 10° C. to about 45° C., controlled in an ice bath, to form a reaction mixture electron charge transfer complex reactive species curing agent for epoxy resins. The pre-reacted reaction mixutre of activated anhydride is then added to the epoxy resin at a reacting mass temperature of preferably between 10° C. and about 45° C., usually at room temperature, after which the resinous composition can be applied to various electrically conducting members, such as copper or aluminum wires, foils, or studs and the like, as an impregnating resin, enamel, casting or potting compound or high speed injection molding compounds or the like. About 25 parts to 200 parts by weight of activated anhydride complex is added per 100 parts by weight of epoxy resin. It is essential to the invention that the selected Lewis Acid catalyst be reacted with the carboxylic acid anhydride to form the activated anhydride before mixture with the epoxy resin. The epoxy-activated anhydride composition will cure, i.e., "C" stage to provide a substantially complete cure of about 95% cross-linking and form an infusible, hard, tack-free, insulation, in thin or thick sections, within 168 hours, generally within 4 hours to 48 hours, at temperatures of between 10° C. and about 45° C. Such low temperature cured resin needs no post-curing.

A closed full coil 10, prepared for insertion into an insulated high voltage electrical machine, such as an insulated high voltage electric motor or generator, is illustrated in FIG. 1. The full coil would be disposed within the slots of the stator surrounding the metal motor armature or generator rotor. The full coil comprises an end portion comprising a tangent 12, a connecting loop 14 and another tangent 16 with bare leads 18 extending therefrom. Slot portions 20 and 22 of the coil which sometimes are hot pressed to precure the resin and to form them to predetermined shape and size are connected to the tangents 12 and 16, respectively. These slot portions are connected to other tangents 24 and 26 connected through another loop 28. In general, generator coils are impregnated and then hot pressed prior to winding; motor coils are generally post impregnated "in situ".

The coils are placed in the slots of the stator of an electrical machine and the end windings wrapped and tied together. The uninsulated leads are then soldered, welded or otherwise connected to each other or to the commutator. In the case of a motor, generally the entire motor containing the coils would be placed in an impregnating bath containing a low viscosity version of the resin of this invention, and vacuum impregnated. Thereafter the impregnated motor could be removed from the impregnating tank, drained, and air dried or low temperature heated up to about 45° C. to cure the completely reactive composition in the coils. Trickle treatment of electrical windngs is also possible with the compositions of this invention.

Figure 2:
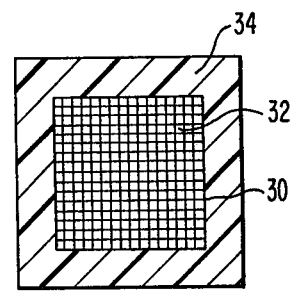
FIG. 2 shows an encapsulated electrical article made with the resinous composition of this invention.

FIG. 2 shows an insulated electrical member such as a coil 30, which has conductors 32, potted or encapsulated in a cured insulating casting 34, the casting being the resinous composition of this invention applied to the member and cured at room temperature or by low temperature heating up to about 45° C.

Figure 3:
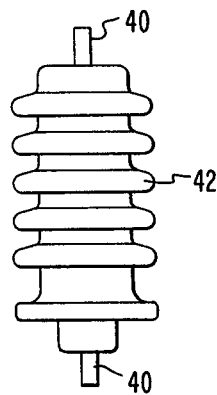
FIG. 3 shows a bushing made with the resinous composition of this invention.

FIG. 3 shows a bushing assembly, where a conducting stud 40 has the resinous composition of this invention in highly filled form cast about it to form the bushing insulation 42.

EXAMPLE 1

Five resin formulations were made, each containing as a base resin; 100 parts of 3,4-epoxycyclohexylmethyl-3,4-epoxycyclohexane carboxylate, a liquid epoxy having a viscosity at 25° C. of 350 cps. to 450 cps. (sold commercially by Union Carbide, under the tradename ERL-4221 cycloaliphatic epoxy resin). In Sample (A):0.2 part of stannic chloride ($SnCl_4$) was dropwise admixed over a 3 minute period with 100 parts of liquid methyl endomethylenetetrahydrophthalic anhydride (NMA) and the reacting mixture was maintained at about 20° C. in an ice bath. This formed a solution of a reaction product charge transfer complex activated anhydride, as described hereinabove, which changed from a pale yellow to amber color after mixing. One hundred parts of this activated anhydride was then homogeneously mixed over a 10 minute period with 100 parts of liquid ERL-4221 at a mixture temperature of 25° C. In Sample (B):0.14 part of $SnCl_4$ was dropwise admixed over a 3 minute period with 100 parts of 1-methyl tetrahydrophthalic anhydride (THPA) and the reacting mixture was maintained at about 20° C. in an ice bath. This formed a solution of a reaction product charge transfer complex activated anhydride, which changed from a pale yellow to amber color after mixing. One hundred parts of this activated anhydride was then homogeneously mixed over a 10 minute period with 100 parts of liquid ERL-4221 at a mixture temperature of 25° C. In Sample (C):0.4 part of titanium tetrachloride ($TiCl_4$) was dropwise admixed with 100 parts of liquid 1-methyl tetrahydrophthalic anhydride (THPA) and the reacting mixture was maintained at about 20° C. in an ice bath. This formed a section of a reaction product charge transfer complex activated anhydride, which changed from a pale yellow to amber color after mixing. One hundred parts of this activated anhydride was then homogeneously mixed over a 10 minute period with 100 parts of liquid ERL-4221 at a mixture temperature of 25° C. In sample (D):0.56 part of $SnCl_4$ was dropwise admixed with 100 parts of 1-methyltetrahydrophthalic anhydride (THPA) and the reacting mixture was maintained below 35° C. in an ice bath. This formed a solution of a reaction product charge transfer complex activated anhydride, which changed from a pale yellow to a very deep amber color after mixing, and started to show considerable exotherm. One hundred parts of this activated anhydride was then mixed with 100 parts of liquid ERL-4221, initially at a mixture temperature of about 25° C. The curing agent epoxy mixture started to gain in viscosity immediately, and the temperature of the mass increased to about 40° C. The sample had to be cast before completely homogeneous mixing was accomplished.

As a comparative example, Sample (E) was prepared. In Sample (E):17.2 parts of n-butylstannoic acid (BSA) was admixed with 100 parts of methyl endomethylenetetrahydrophthalic anhydride (NMA) for 2 hours at 100° C. and then for about 2 additional hours at 150° C., in order to solubilize the organo-tin acid in the anhydride and provide a solution. Upon cooling to 25° C., the admixture formed a semi-solid. One hundred parts of this admixture was then homogeneously mixed over a 20 minute period with 100 parts of liquid ERL-4221 at 25° C. Samples, similar to those of Samples (A), (B) and (C), were mixed at an epoxy resin mixture temperature of about 50° C. This resulted in instantaneous "popcorn" gellation of the epoxy making homogeneous mixing impossible.

Ten grams of each sample was then cast into a 2" diameter aluminum dish. Each sample was about 0.1" thick. Each sample was allowed to gel until firm but tacky, and then allowed to sit until it was substantially completely cured i.e., solid and infusible, all at 25° C. Dielectric constant values $\epsilon'$ and 60 Hz power factor values (ASTM designation D150-65T) were then obtained for Samples (B) (C) and (D). The results of these tests are shown below in TABLE 1:

TABLE 1

| Sample | Curing Agent Admixture | Anhydride Mixture Temp. | Epoxy Mixture Temp. | Gel Time 25° C. | Cure Time 25° C. | Electrical Properties** | |
|---|---|---|---|---|---|---|---|
| | | | | | | 100 × tan δ at 25° C. | $\epsilon'$ at 25° C. |
| (A) | 0.2p $SnCl_4$ 100p NMA | 20° C. | 25° C. | 12 hr | 36 hr | nm | nm |
| (B) | 0.14p $SnCl_4$ 100p THPA | 20° C. | 25° C. | 16 hr | 48 hr | 0.40 | 2.72 |
| (C) | 0.4p $TiCl_4$ 100p THPA | 20° C. | 25° C. | 48 hr | 144 hr | 0.10 | 3.10 |
| (D) | 0.56p $SnCl_4$ 100p THPA | 35° C. | 40° C. | 30 sec | 2 hr | 0.15 | 1.10 |
| (E)* | 17.2p BSA 100p NMA | 150° C. | 25° C. | 144 hr | nm | nm | nm |

*Comparative Example
**After 14 days storage at 25° C.; no heat cure
nm = not measured As can be seen, from Table 1, Samples (A) and (B) provided very good gel and cure times, and Sample (C) provided acceptable gel and cure times. Samples (B) and (C) provided outstanding electrical properties for a resin system having no heat cure. Sample (A) should provide electrical values slightly above Sample (B). Acceptable power factors for electrical insulation applications are below 5.0 at 25° C., and acceptable dielectric constant values $\epsilon'$ are below 8.0 at 25° C.

Sample (D), having a relatively high $SnCl_4$ concentration, while providing outstanding electrical properties, gels very fast and could find application in sophisticated high velocity spray mixing injection molding systems. Use of about 50 parts activated anhydride/100 parts epoxy in Sample (D) would result in higher gel and cure times in a range similar to Sample (A). Sample (E), using appropriate amounts of organo stannoic acid, requires substantial long term heat application to dissolve it in the anhydride, and would in many instances require heat application to homogeneously admix it into the epoxy, eliminating it as a complete, room temperature type of epoxy curing agent system.

The other Lewis Acid catalysts, epoxies, anhydrides and mixtures of anhydrides discussed hereinabove would also be useful in providing acceptable gel, cure and electrical properties at 25° C. All of these Samples (A), (B), (C) and (D) compositions could have the various ingredients described hereinabove added, such as diluents, fillers, etc. to provide various other systems useful for specific applications, such as impregnating resins for mica tapes, potting resins for coils in transformers, or encapsulating resins for bushing studs.

We claim:

1. An electron charge transfer complex, useful as a curing agent, consisting essentially of a mixture of liquid organic carboxylic acid anhydride selected from the group consisting of monofunctional anhydrides, polyfunctional anhydrides and mixtures thereof, and Lewis Acid catalyst selected from the group consisting of $SnCl_4$, $TiCl_4$, $SbCl_5$, $SbF_5$, $BF_3$, $PF_5$ and mixtures thereof, forming carboxylic cationic species.

2. The electron charge transfer complex of claim 1 where the Lewis Acid catalyst is selected from the group consisting of $SnCl_4$, $TiCl_4$ and mixtures thereof.

3. The electron charge transfer complex of claim 1, where the weight ratio of Lewis Acid catalyst: carboxylic acid anhydride is from 0.0060:1 to 0.0001:1.

4. The electron charge transfer complex of claim 1, where the anhydride and Lewis Acid catalyst are mixed, to form the carboxylic cationic species, at a reacting mass temperature of between 10° C. and about 45° C., and the carboxylic cationic species has unbroken anhydride rings.

5. The electron charge transer complex of claim 1, where the anhydride is selected from the group consisting of methyl endomethylenetetrahydrophthalic anhydride and 1-methyl-tetrahydrophthalic anhydride, and the Lewis Acid catalyst is selected from the group consisting of $SnCl_4$ and $TiCl_4$.

6. A resinous, low temperature curable, epoxy insulating composition comprising:
(a) an epoxy resin; and
(b) an electron charge transfer complex curing agent consisting essentially of a mixture of liquid organic carboxylic acid anhydride selected from the group consisting of monofunctional anhydrides, polyfunctional anhydrides and mixtures thereof, and Lewis Acid catalyst selected from the group consisting of $SnCl_4$, $TiCl_4$, $SbCl_5$, $SbF_5$, $BF_3$, $PF_5$ and mixtures thereof, forming a carboxylic cationic species, said epoxy insulating composition being characterized as curable at a temperature of between 10° C. and about 45° C.

7. The composition of claim 6, where the Lewis Acid catalyst is selected from the group consisting of $SnCl_4$, $TiCl_4$, and mixtures thereof.

8. The composition of claim 6, where the weight ratio of Lewis Acid catalyst:carboxylic acid anhydride is from 0.0060:1 to 0.0001:1.

9. The composition of claim 6, where the anhydride and Lewis Acid catalyst were mixed, to form the carboxylic cationic species, at a reacting mass temperature of between 10° C. and about 45° C., and the carboxylic cationic species has unbroken anhydride rings.

10. The composition of claim 6, where the electron charge transfer complex anhydride component is selected from the group consisting of methyl endomethylenetetrahydrophthalic anhydride and 1 methyl-tetrahydrophthalic anhydride, and the Lewis Acid catalyst component is selected from the group consisting of $SnCl_4$ and $TiCl_4$.

11. The composition of claim 6, where between about 25 parts to about 200 parts by weight of electron charge transfer complex curing agent is used per 100 parts by weight of epoxy resin.

12. The composition of claim 6, where the weight ratio of Lewis Acid catalyst:carboxylic acid anhydride is from about 0.0040:1 to 0.0001:1.

13. The composition of claim 6, where the epoxy composition is further characterized as being curable within 168 hours.

14. The composition of claim 6, where the Lewis Acid catalyst is $SnCl_4$.

15. The composition of claim 6, also containing filler particles.

16. An electrically conducting member and a cured body of resinous insulation applied to the member, the insulation comprising the cured resinous composition of claim 6.

17. A resinous, low temperature curable, epoxy insulating composition comprising the admixture of:
(a) an epoxy resin, and
(b) an electron charge transfer complex curing agent reactive with the epoxy resin, said complex consisting essentially of the reaction product, of a Lewis Acid catalyst selected from the group consisting of $SnCl_4$, $TiCl_4$, $SbCl_5$, $SbF_5$, $BF_3$, $PF_5$ and mixtures thereof, and a liquid organic carboxylic acid anhydride, mixed at a reacting mass temperature of between 10° C. and about 45° C., where the weight ratio of Lewis Acid catalyst:carboxylic acid anhydride is from 0.0060:1 to 0.0001:1, said epoxy insulating composition being characterized as curable at a temperature of between 10° C. and about 45° C.

18. The composition of claim 17, where between about 25 parts to about 200 parts by weight of electron charge transfer complex curing agent is used per 100 parts by weight of epoxy resin, and where (a) and (b) are mixed at a reacting mass temperature of between 10° C. and about 45° C.

19. The composition of claim 17, where the Lewis Acid catalyst is selected from the group consisting of $SnCl_4$, $TiCl_4$ and mixtures thereof, and the liquid organic carboxylic acid anhydride is selected from the group consisting of monofunctional anhydrides, polyfunctional anhydrides and mixtures thereof.

20. A method of making a low temperature curable, epoxy insulating composition comprising the steps of:
(a) admixing, at a reacting mass temperature of between 10° C. and about 45° C., a Lewis Acid catalyst selected from the group consisting of $SnCl_4$, $TiCl_4$, $SbCl_5$, $SbF_5$, $BF_3$, $PF_5$ and mixtures thereof with a liquid organic carboxylic acid anhydride, where the weight ratio of Lewis Acid catalyst: carboxylic acid anhydride is from 0.0060:1 to 0.0001:1, to provide an electron charge transfer complex curing agent,
(b) admixing, at a reacting mass temperature of between 10° C. and about 45° C., the electron charge transfer complex with an epoxy resin, to provide an epoxy composition characterized as curable at a temperature of between 10° C. and about 45° C.

21. The method of claim 19, where the Lewis Acid catalyst is selected from the group consisting of $SnCl_4$, $TiCl_4$ and mixtures thereof, and the liquid organic carboxylic acid anhydride is selected from the group consisting of monofunctional anhydrides, polyfunctional anhydrides and mixtures thereof.

* * * * *